(12) United States Patent
Nakui

(10) Patent No.: US 10,895,770 B1
(45) Date of Patent: Jan. 19, 2021

(54) DISPLAY DEVICE

(71) Applicant: SHARP KABUSHIKI KAISHA, Sakai (JP)

(72) Inventor: Masanao Nakui, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 16/918,539

(22) Filed: Jul. 1, 2020

Related U.S. Application Data

(60) Provisional application No. 62/871,636, filed on Jul. 8, 2019.

(51) Int. Cl.
*G02F 1/1333* (2006.01)
*G02F 1/133* (2006.01)

(52) U.S. Cl.
CPC .... *G02F 1/133308* (2013.01); *G02F 1/13306* (2013.01); *G02F 2202/28* (2013.01)

(58) Field of Classification Search
CPC .............................................. G02F 1/133308
USPC ........................................................ 362/97.2
See application file for complete search history.

(56) References Cited

U.S. PATENT DOCUMENTS

| | | | | |
|---|---|---|---|---|
| 2005/0030443 | A1* | 2/2005 | Nagahama | G02B 6/0088 349/64 |
| 2007/0146612 | A1* | 6/2007 | Fujishima | G02F 1/133308 349/149 |
| 2009/0067112 | A1* | 3/2009 | Takabayashi | G02F 1/136204 361/220 |
| 2009/0079894 | A1* | 3/2009 | Okuda | G02F 1/133308 349/58 |
| 2011/0188263 | A1* | 8/2011 | Cho | G02F 1/133308 362/606 |
| 2014/0092339 | A1* | 4/2014 | Yoshimura | G02F 1/133308 349/58 |
| 2018/0242412 | A1* | 8/2018 | Kang | G02B 6/009 |
| 2020/0026116 | A1* | 1/2020 | Matsumoto | G02F 1/133308 |
| 2020/0110216 | A1* | 4/2020 | Tobi | G02B 6/0088 |
| 2020/0219425 | A1* | 7/2020 | Nojiri | G02F 1/13338 |

FOREIGN PATENT DOCUMENTS

JP 2010-271631 A 12/2010

* cited by examiner

*Primary Examiner* — Bryon T Gyllstrom
(74) *Attorney, Agent, or Firm* — ScienBiziP, P.C.

(57) ABSTRACT

A display device includes an illumination device and a display panel. The display panel faces the illumination device and displays an image using light supplied from the illumination device. The display device includes a chassis housing the illumination device; and an adhesive tape bonding the display panel and the chassis together. The adhesive tape has a comb-shape including a body disposed along an edge of the chassis, and a plurality of protrusions extending from the body.

7 Claims, 6 Drawing Sheets

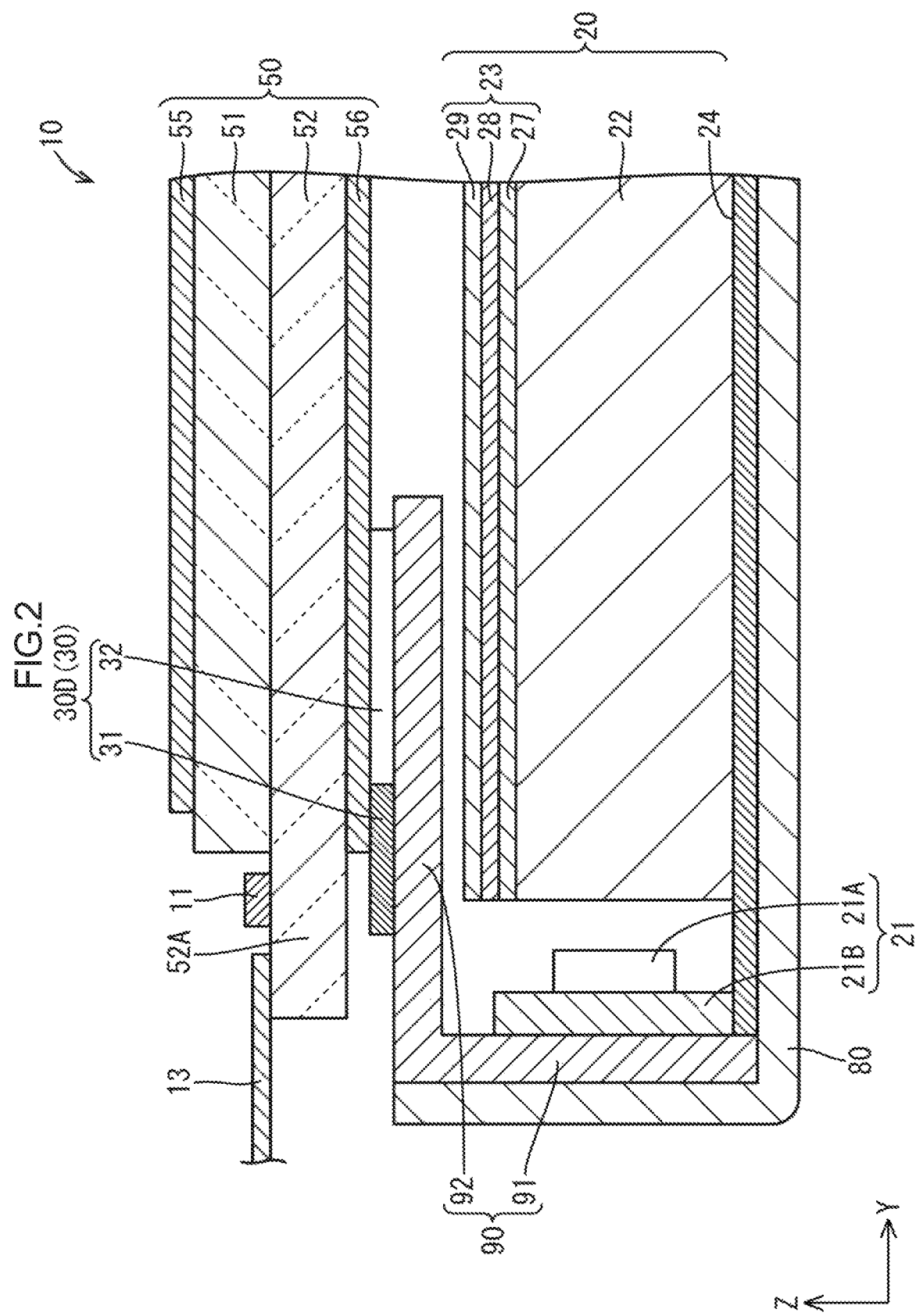

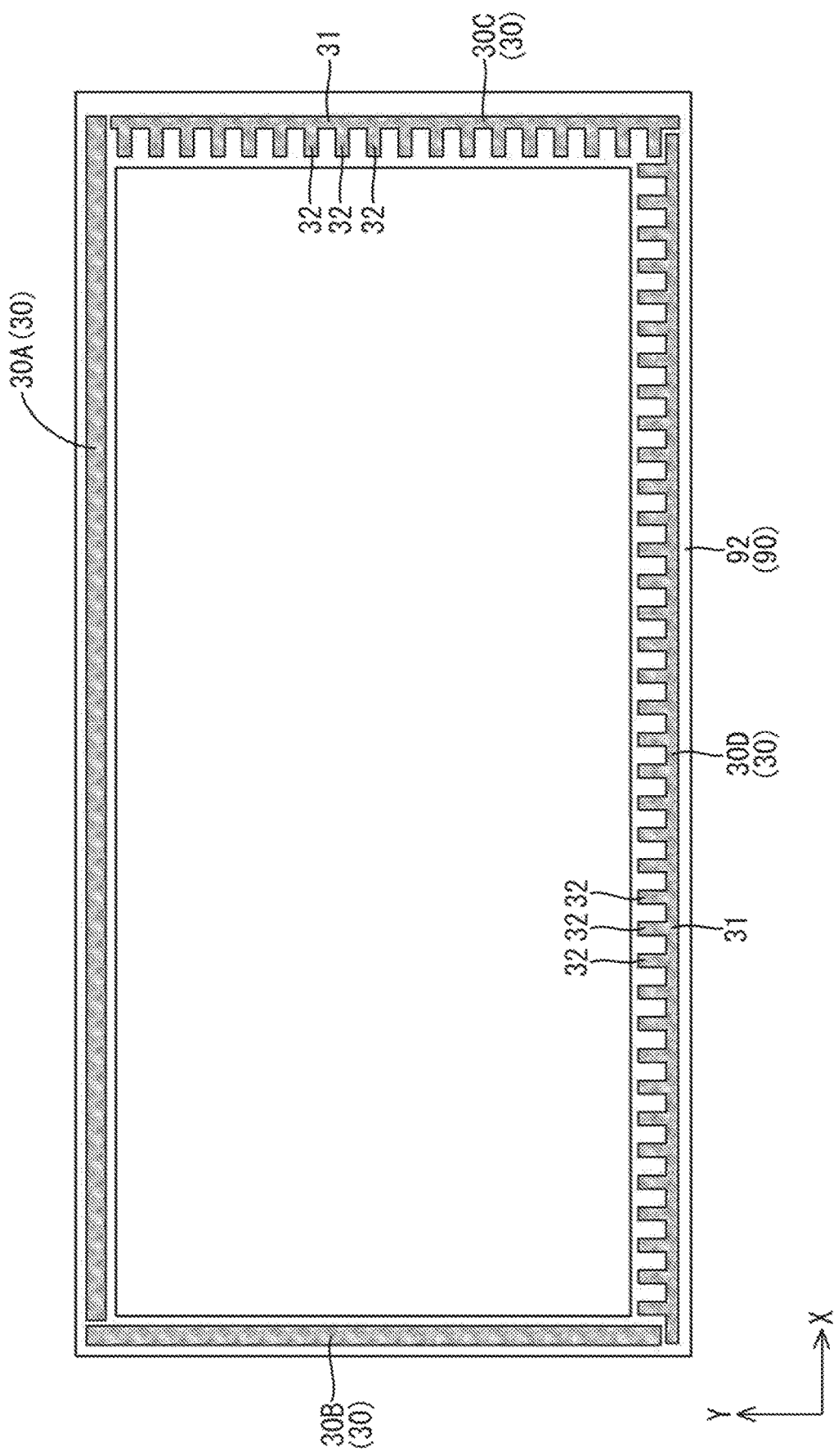

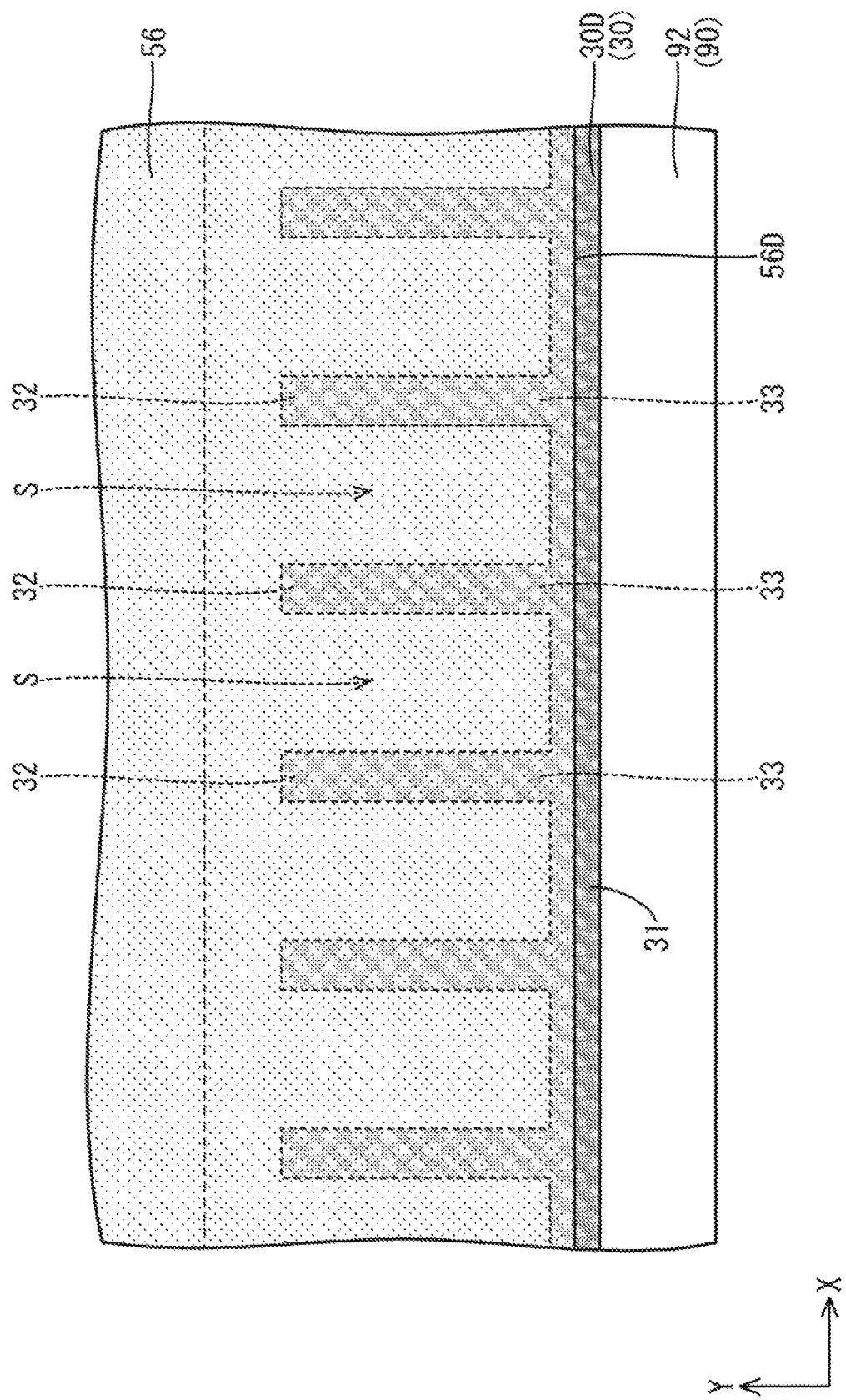

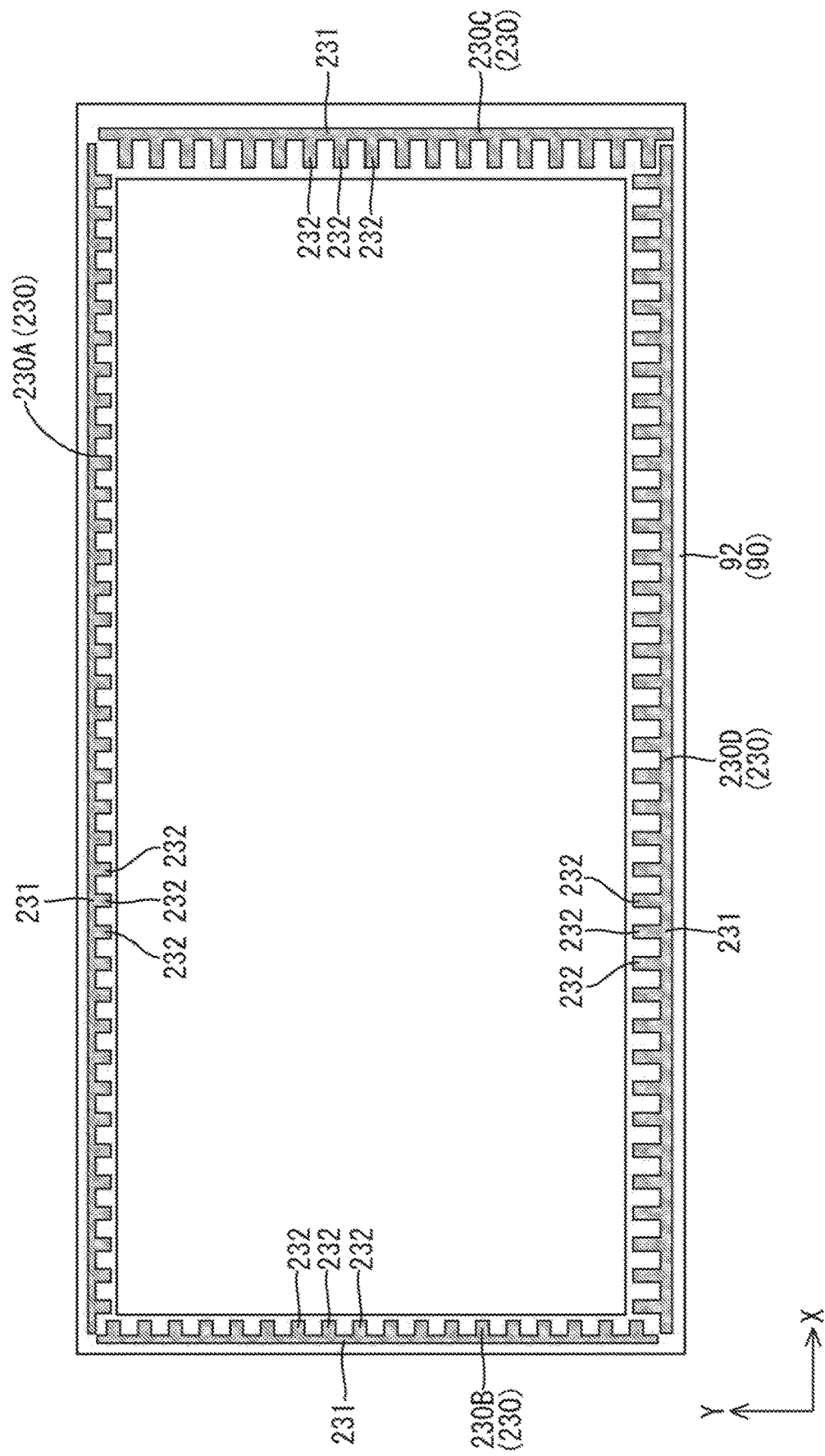

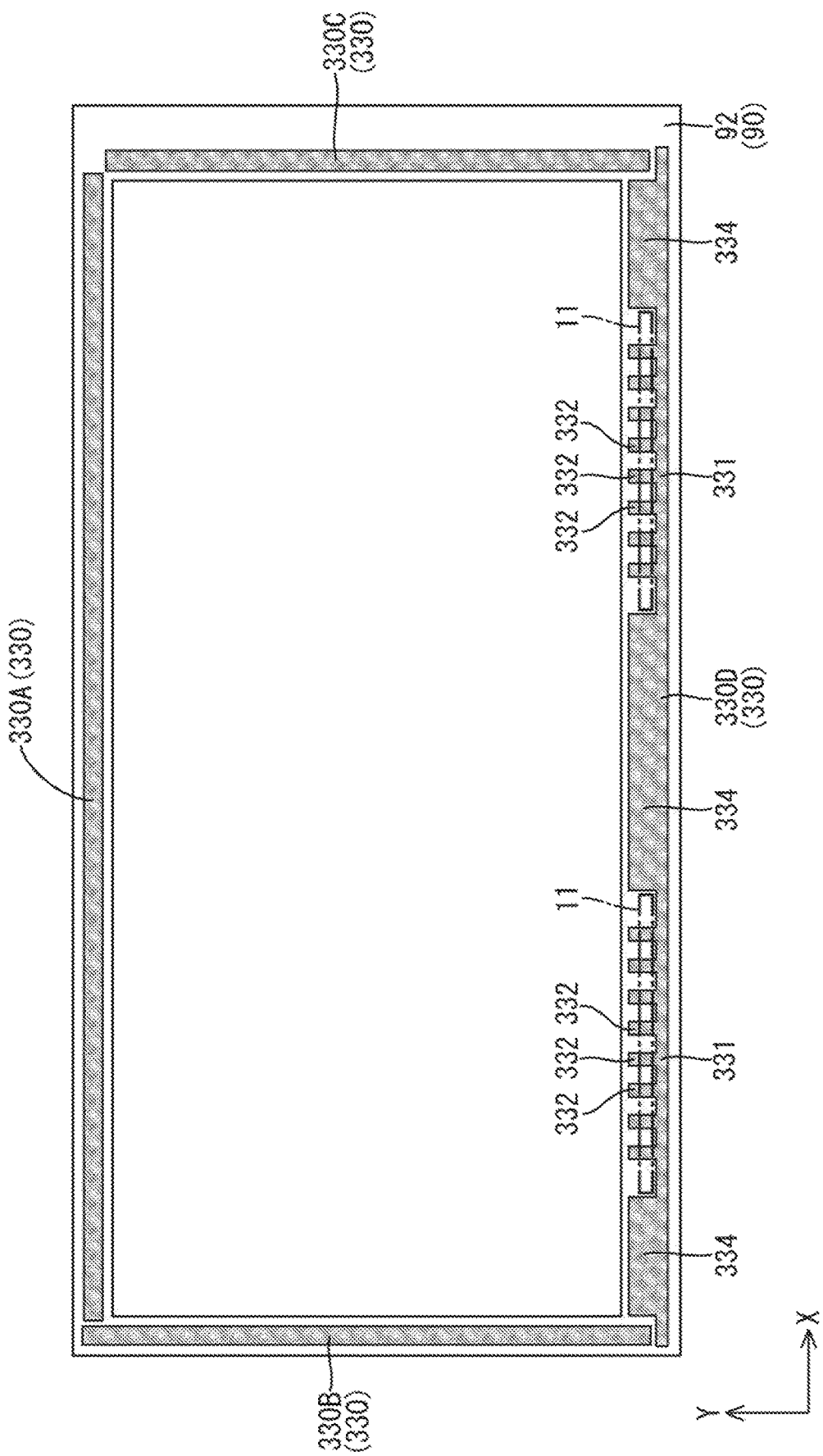

DISPLAY DEVICE

CROSS REFERENCE TO RELATED APPLICATION

The present application claims priority from U.S. Provisional Application No. 62/871,636, filed Jul. 8, 2019, the entire contents of which are hereby incorporated by reference into this application.

BACKGROUND OF THE INVENTION

1. Field of the Invention

The present invention relates to a display device.

2. Description of the Related Art

A conventionally known display device is described in Japanese Patent Application Publication No. 2010-271631. The display device (i.e., liquid-crystal display) disclosed in Japanese Patent Application Publication No. 2010-271631 includes a liquid-crystal display panel that is joined, via a double-faced adhesive layer, to the frame edge of a chassis having inside a backlight unit (i.e., a backlight-contained chassis). The double-faced adhesive layer has a frame-shape that conforms to the shape of the chassis frame edge.

SUMMARY OF THE INVENTION

The configuration disclosed in Japanese Patent Application Publication No. 2010-271631 unfortunately can exhibit chassis expansion or chassis contraction depending on temperature change, or can exhibit chassis deformation resulting from local application of force. Accordingly, the display panel (i.e., liquid-crystal display), joined to the chassis via the double-faced adhesive layer, can be deformed and thus can exhibit display unevenness. One possible way to prevent deformation of the display panel is reducing the area of the joint between the display panel and the double-face adhesive layer, but the display panel easily peels off from the double-face adhesive layer in this case.

To solve the above problem, it is an object of an embodiment of the present invention to provide a display device whose display panel is less likely to be deformed and is less likely to peel off.

(1) To solve the above problem, an embodiment of the present invention provides a display device that includes an illumination device and a display panel. The display panel faces the illumination device and displays an image using light supplied from the illumination device. The display device includes a chassis housing the illumination device and includes an adhesive tape bonding the display panel and the chassis together. The adhesive tape has a comb-shape that includes a body disposed along an edge of the chassis and includes a plurality of protrusions extending from the body.

(2) In addition to Configuration 1, the display device according to an embodiment of the present invention is configured such that the plurality of protrusions each have a shape extending from the body inwardly in the plane of the display panel.

(3) In addition to Configuration 2, the display device according to an embodiment of the present invention is configured such that the adhesive tape has proximal ends from which the plurality of protrusions extend. The display device is also configured such that the display panel includes an end disposed outside the proximal ends in the plane of the display panel, so that the display panel is bonded to the plurality of protrusions and the body.

(4) In addition to any one of Configurations 1 to 3, the display device according to an embodiment of the present invention includes a driver that drives the display panel. The display device is configured such that the plurality of protrusions are disposed at least at an edge of the chassis adjacent to the driver.

(5) In addition to any one of Configurations 1 to 4, the display device according to an embodiment of the present invention is configured such that the adhesive tape has the comb-shape along the entire circumference of the chassis.

(6) In addition to Configuration 4, the display device according to an embodiment of the present invention is configured such that the adhesive tape includes a strip extending, in the form of a strip, from the body at the edge of the chassis adjacent to the driver.

(7) In addition to any one of Configurations 1 to 6, the display device according to an embodiment of the present invention is configured such that the display panel is a liquid-crystal panel containing a liquid crystal.

An embodiment of the present invention can provide a display device whose display panel is less likely to be deformed and is less likely to peel off.

BRIEF DESCRIPTION OF DRAWINGS

FIG. 2 is a cross-sectional view of the display device, taken along line II-II in FIG. 1;

FIG. 3 is a front view of an adhesive tape;

FIG. 4 is an enlarged front view of the adhesive tape and of a back polarizer plate;

FIG. 5 is a front view of an adhesive tape of a display device according to a second embodiment; and FIG. 6 is a front view of an adhesive tape of a display device according to a third embodiment.

DETAILED DESCRIPTION OF THE INVENTION

First Embodiment

Figure 1:
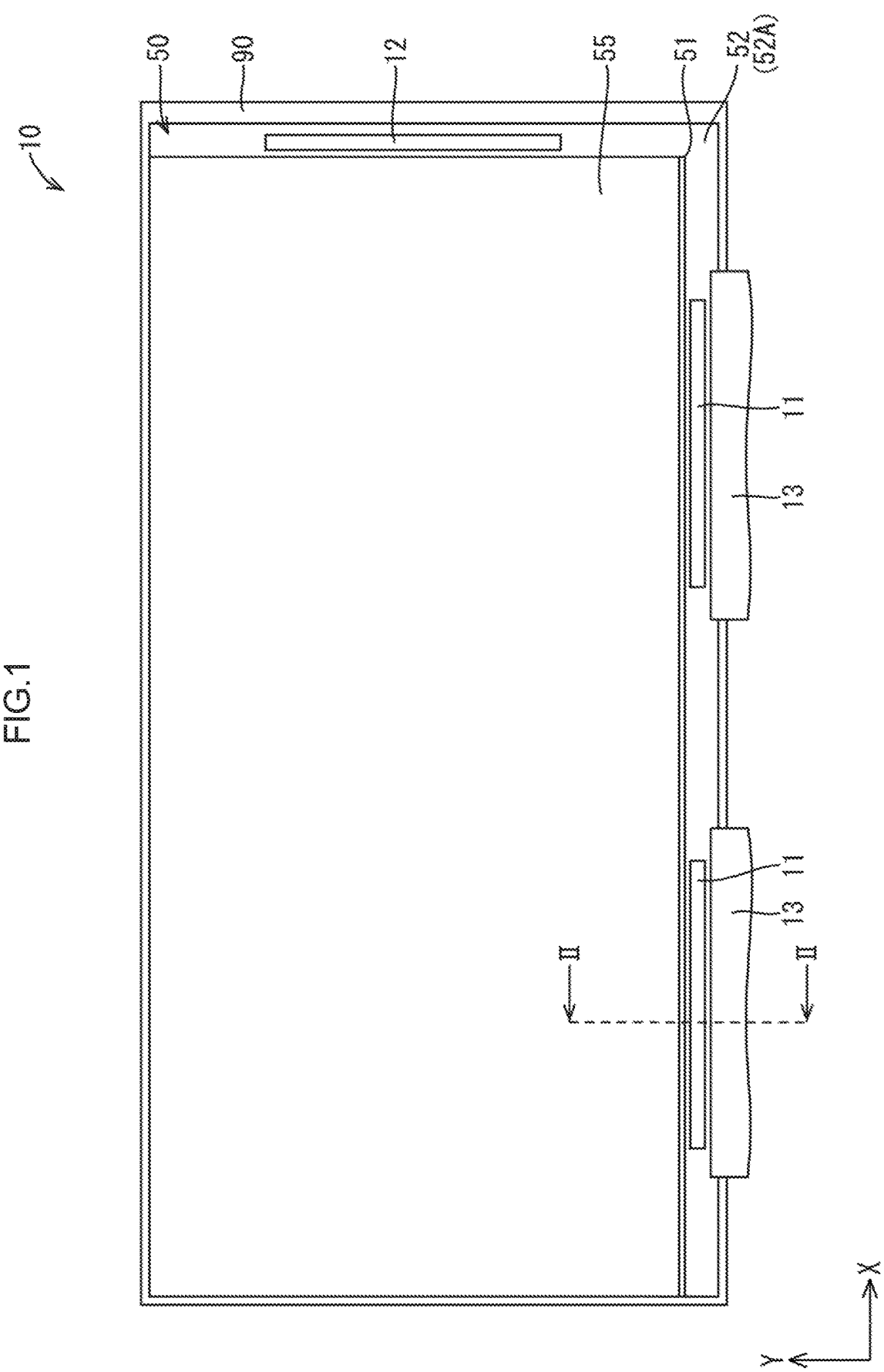
FIG. 1 is a front view of a display device according to a first embodiment.

A first embodiment of the present invention will be described with reference to FIGS. 1 to 4. This embodiment describes a liquid-crystal display (i.e., display device) 10 installed in a TV set. Herein, each drawing shows an X-axis, Y-axis, and Z-axis, and each axis is oriented in the same direction throughout the drawings. In each drawing, the longer-side direction of the liquid-crystal display 10 corresponds to the X-direction, and the shorter-side direction of the same corresponds to the Y-direction. In addition, a direction orthogonal to the X-Y plane corresponds to the Z-direction. With reference to FIG. 2, the liquid-crystal display 10 lies with its front side located in the upper part of the drawing sheet and with its back side located in the lower part of the same.

As shown in FIGS. 1 and 2, the liquid-crystal display 10 has a stack of multiple components to form a rectangle. The liquid-crystal display 10 includes an illumination device 20, and a liquid-crystal panel (i.e., display panel) 50 adjacent to the front side of the illumination device 20 and facing the illumination device 20. The liquid-crystal panel 50 displays an image using light supplied from the illumination device 20. The illumination device 20 and the liquid-crystal panel 50 are integrally secured by a bezel not shown and chassis 80 and 90 described later on.

As shown in FIG. 2, the illumination device 20 has the following components: a light source 21 that is disposed on one of the longer sides; a light-guiding member 22 that is a rectangular plate disposed on the side of the light source 21; an optical sheet 23 that is a sheet disposed on the front side of the light-guiding member 22; and a reflective sheet 24 that is a sheet disposed on the back side of the light-guiding member 22 and placed in the chassis 80. The illumination device 20, although herein being an edge-lit illumination device, in which light from the light source 21 enters the illumination device from the side of the light-guiding member 22, may be a direct-lit illumination device, in which the liquid-crystal panel is supplied with light from its back surface (or back side). The illumination device 20 can be also referred to as a backlight.

The light source 21 has multiple LEDs 21A that emit white light, and an LED substrate 21B on which the LEDs 21A are arranged at regular intervals. The light-guiding member 22 is made of a transparent synthetic resin material, including acrylic resin (e.g., PMMA) and polycarbonate. The light-guiding member 22 has a refractive index sufficiently higher than that of air. The light from the light source 21 enters the light-guiding member 22, propagates through the light-guiding member 22, and goes out to the optical sheet 23 (i.e., the front side). The light propagating through the light-guiding member 22, if leaking to the back side, is reflected to the optical sheet 23 by the reflective sheet 24.

The optical sheet 23 adds an optical action to the light emitted from the light source 21 and light-guiding member 22, and then outputs the light toward the liquid-crystal panel 50 (or toward the front side). The optical sheet 23 is a three-ply sheet in which a first prism sheet 27, a second prism sheet 28, and a diffusion sheet 29 are laminated from the back side in this order.

The liquid-crystal panel 50 has a pair of substrates 51 and 52 joined together with a predetermined gap therebetween. The liquid-crystal panel 50 also has polarizer plates 55 and 56 that are disposed on the outer surfaces of the substrates 51 and 52 and polarize the light supplied from the illumination device 20. The liquid-crystal panel 50 also has a liquid-crystal layer (not shown) containing liquid-crystal molecules, which are substances, held between the substrates 51 and 52 and whose optical property changes upon field application. The liquid-crystal panel 50 also has a seal portion (not shown) surrounding and sealing the liquid-crystal layer. The liquid-crystal panel 50 operates in transverse-field mode, such as an in-plane-switching (IPS) mode or a fringe-field-switching (FFS) mode.

The substrates 51 and 52 are a pair of glass substrates that includes a CF substrate 51 and an array substrate (i.e., TFT substrate) 52 disposed on the back side of the CF substrate 51. The CF substrate 51 includes a color filter (not shown) in which there colors: R, G, and B are arranged alternately. The array substrate 52 includes switching elements, pixel electrodes, and other components arranged in matrix (or in lows and columns). The polarizer plates 55 and 56 includes a front polarizer plate 55 disposed on the front side of the CF substrate 51 and includes a back polarizer plate 56 disposed on the back side of the array substrate 52.

As shown in FIGS. 1 and 2, the array substrate 52 includes a non-overlap portion 52A that laterally extends off the CF substrate 51 at the end of one of the shorter sides (i.e., the right side in FIG. 1) and at the end of one of the longer sides (i.e., the lower side in FIG. 1). The non-overlap portion 52A does not overlap the CF substrate 51 and the polarizer plates 55 and 56, and is a non-display region of the liquid-crystal panel 50 where an image is not displayed.

Disposed in the non-overlap portion 52A are drivers 11 and 12 that supply various signals relating to display functions, and a flexible board 13.

The drivers 11 and 12 are each composed of an LSI chip having a drive circuit inside, and they are placed in the non-overlap portion 52A through chip-on-glass (COG). The drivers 11 and 12 include two source drivers 11 that output a signal for display, and one gate driver 12 that outputs a gate voltage. The source drivers 11 are aligned in the X-direction on one of the longer sides. The gate driver 12 is disposed in the Y-direction on one of the shorter sides. The flexible board 13 is composed of a pattern of multiple wires on an insulating and flexible base material. The flexible board 13 is connected to the non-overlap portion 52A and a control substrate (not shown), thus transmitting various signals from the control substrate to a display region of the liquid-crystal panel 50, which is in the middle of the liquid-crystal panel 50.

As shown in FIG. 2, the chassis 80 and 90 houses the illumination device 20. The chassis 80 and 90 includes a back chassis 80 that is a casing. The chassis 80 and 90 also includes a front chassis 90 that is a frame (c.f., FIG. 3) with its front side attached inside the back chassis 80. The front chassis 90 is also referred to as a backlight frame and can be made of synthetic resin or metal. The front chassis 90 includes an upright wall 91 standing in the Z-direction. The front chassis 90 also includes an inner wall 92 facing the optical sheet 23 and extending toward the display region of the liquid-crystal panel 50; that is, the inner wall 92 extends in the Y-axis direction (or extends inwardly in the plane of the liquid-crystal panel 50; hereinafter just referred to as the plane inside). The inner wall 92 constitutes the edge of the chassis 80 and 90.

The inner wall 92 has a front surface (i.e., a surface on the front side) on which an adhesive tape 30 is attached. The adhesive tape 30 is a piece of tape with its both surfaces applied with a sticky agent. The adhesive tape 30 is attached on the back surface of the back polarizer plate 56 (i.e., a surface on the back side). The adhesive tape 30 is attached on the back polarizer plate 56 and the inner wall 92, thus integrally securing the liquid-crystal panel 50 and the front chassis together.

As shown in FIG. 3, the adhesive tape 30 includes a gate-driver adhesive tape 30C disposed on one of the shorter sides and adjacent to the gate driver 12 (i.e., the right side in FIG. 1). The adhesive tape 30 also includes a source-driver adhesive tape 30D disposed on one of the longer sides and adjacent to the source drivers 11 (i.e., the lower side in FIG. 1). The adhesive tape 30 further includes an upper adhesive tape 30A opposite to the source-driver adhesive tape 30D (i.e., the upper side in FIG. 1), and includes a left adhesive tape 30B opposite to the gate-driver adhesive tape 30C (i.e., the left side in FIG. 1). The adhesive tape 30 is a piece of tape in which these four adhesive tapes 30A, 30B, 30C, and 30D are arranged along the inner wall 92 of the front chassis 90 to form a frame.

As shown in FIGS. 1 to 3, the gate-driver adhesive tape 30C (hereinafter just referred to as an adhesive tape 30C) overlaps ends disposed outside the plane of the liquid-crystal panel 50 (hereinafter just referred to as the plane outside) and overlaps the gate driver 12. Moreover, the source-driver adhesive tape 30D (hereinafter just referred to as an adhesive tape 30D) overlaps ends disposed on the plane outside of the liquid-crystal panel 50 and overlaps the source drivers 11.

As shown in FIGS. 2 to 4, the adhesive tapes 30C and 30D each include a body 31 extending along the edge of the chassis 80 and 90 (i.e., the inner wall 92) and each include multiple protrusions 32 extending from the body 31 to the plane inside. The adhesive tapes 30C and 30D, each of which includes the protrusions 32 extending from the body 31 to the plane inside, are also referred to as pieces of comb-shaped tape. The protrusions 32 are arranged in parallel across the body 31 at predetermined intervals. For instance, the adhesive tape 30D in FIG. 3 is configured such that its body 31, extending along where the inner wall 92 extends in the X-direction, has multiple protrusions 32 arranged in parallel from one of the body ends adjacent to the adhesive tape 30B to the other body end adjacent to the adhesive tape 30C at predetermined intervals.

As shown in FIG. 4, the adhesive tape 30D has proximal ends 33 from which the respective protrusions 32 extend. Each proximal end 33 is between the body 31 and protrusion 32 and is closer to the outside of the plane (i.e., plane outside) of the liquid-crystal panel 50 (or back polarizer plate 56) than the protrusion 32 is. The back polarizer plate 56 of the liquid-crystal panel 50 has an end 56D on the plane outside of the liquid-crystal panel 50. The end 56D overlaps the body 31 in a location closer to the plane outside than the proximal ends 33 are, so that the back polarizer plate 56 is joined to the protrusions 32 and body 31. The end 56D of the back polarizer plate 56 is on the body 31 of the adhesive tape 30 and is not on the protrusions 32. Thus, each protrusion 32 is, in its entirety, in contact with the surface of the back polarizer plate 56 and is sandwiched between the inner wall 92 and the back polarizer plate 56 in the Z-axis direction, as shown in FIG. 2.

The following described effects of this embodiment. The liquid-crystal display (i.e., display device) 10 in this embodiment includes the illumination device 20 and the liquid-crystal panel (i.e., display panel) 50. The liquid-crystal panel 50 faces the illumination device 20 and displays an image using light supplied from the illumination device 20. The liquid-crystal display 10 includes the chassis 90 housing the illumination device 20 and includes the adhesive tape 30D joining the liquid-crystal panel 50 and the chassis 90 together. The adhesive tape 30D has a comb-shape that includes the body 31 disposed along an edge of the chassis 90 and includes multiple protrusions 32 extending from the body 31.

In such a liquid-crystal display 10, the adhesive tape 30D, which has a comb-shape that includes the body 31 and the protrusions 32 extending from the body 31, has spaces S (c.f., FIG. 4) between the protrusions 32. The region in the liquid-crystal panel 50 (or back polarizer plate 56) overlapping the adhesive tape 30D thus has a portion that is joined to the adhesive tape 30D (i.e., a portion joined to the body 31 and protrusion 32), and has a portion that is not joined to the adhesive tape 30D (i.e., a portion overlapping the spaces S between the protrusions 32). For a deformation in the chassis 90 due to a temperature change, external pressure, or other factors, such a configuration enables the liquid-crystal panel 50 to maintain adhesion in the portion joined to the body 31 and protrusion 32, and also fails to propagate the deformation in the chassis 90 to the portion overlapping the spaces S between the protrusions 32. As a result, the liquid-crystal panel 50 is less likely to be deformed as a whole.

In this embodiment, the protrusions 32 extend from the body 31, disposed along the edge of the chassis 90, to the plane inside of the display panel 50 (or back polarizer plate 56), which is adjacent to the display region. The liquid-crystal display 10 with such a configuration can prevent, in the spaces S between the protrusions 32, from accumulation of foreign substances coming from the plane outside.

In this embodiment, the adhesive tape 30D has the proximal ends 33 from which the respective protrusions 32 extend. In addition, the end on the plane outside of the liquid-crystal panel 50 (i.e., the end 56D of the back polarizer plate 56) is closer to the plane outside than the proximal ends 33 are, so that the liquid-crystal panel 50 is joined to the protrusions 32 and body 31.

Such a configuration of the liquid-crystal display 10 can suitably join the liquid-crystal panel 50 to the protrusions 32 and body 31 while covering the spaces S between the protrusions 32 with the liquid-crystal panel 50. This can prevent entrance of foreign substances from the spaces S between the protrusions 32, and accumulation of these substances inside the chassis 90 (e.g., a location adjacent to the illumination device 20).

In this embodiment, the liquid-crystal display 10 includes the drivers 11 and 12 that drive the liquid-crystal panel 50. In addition, the protrusions 32 are disposed at least at the edge of the chassis 90 adjacent to the drivers 11 and 12.

Such a liquid-crystal display 10 can prevent deformation in the liquid-crystal panel 50 near the drivers 11 and 12 that tends to have relatively high temperature. Such a liquid-crystal display 10 can also reduce the width of the adhesive tapes 30A and 30B, disposed at the edge of the chassis 90 other than the edge adjacent to the drivers 11 and 12, and thus can achieve a narrow frame.

In this embodiment, the liquid-crystal panel 50 is a liquid-crystal panel containing liquid crystals. For a deformation in the chassis 90 due to a temperature change or other factors, such a liquid-crystal display 10 can have the liquid-crystal panel 50 that is less likely to be deformed and is less likely to peel off.

Second Embodiment

A second embodiment of the present invention will be described with reference to FIG. 5. This embodiment describes, by way of example only, a liquid-crystal display (i.e., display device) that includes an adhesive tape whose configuration is different from that of the adhesive tape in the foregoing embodiment. Like components between the foregoing embodiment and the second embodiment will be denoted by the same signs, and the structures, actions and effects of the like components will not be elaborated upon here.

An adhesive tape 230 (consisting of four adhesive tapes 230A, 230B, 230C, and 230D) includes a body 231 disposed along the edge of the chassis 90 (i.e., inner wall 92) and includes multiple protrusions 232 extending from the body 231 to the plane inside. The adhesive tape 230 has a comb-shape extending all over the perimeter of the chassis 90 (or all over the front surface of the inner wall 92).

In such a liquid-crystal display, the liquid-crystal panel (i.e., display panel) can be joined with the comb-shaped adhesive tape 230, attached all over the perimeter of the chassis 90. This enables the liquid-crystal panel to be less likely to be deformed, while enhancing the adhesion between the liquid-crystal panel and the chassis 90.

Third Embodiment

A third embodiment of the present invention will be described with reference to FIG. 6. This embodiment describes, by way of example only, a liquid-crystal display (i.e., display device) that includes an adhesive tape whose configuration is different from those of the adhesive tapes in the foregoing embodiments. Like components between the foregoing embodiments and the third embodiment will be denoted by the same signs, and the structures, actions and effects of the like components will not be elaborated upon here.

A source-driver adhesive tape 330D, one of four adhesive tapes 330A, 330B, 330C, and 330D, is adjacent to the source drivers 11 (denoted by dot-dash lines). The source-driver adhesive tape 330D includes a body 331 disposed along the edge of the chassis 80 and 90 (i.e., inner wall 92), includes multiple protrusions 332 extending from the body 331 to the plane inside, and includes multiple strips 334 extending from the body to the plane inside in the form of strips. The source-driver adhesive tape 330D, which includes the protrusions 332 extending from the body 331 to the plane inside, is also referred to as a piece of comb-shaped tape. The strips 334 are wider than the protrusions 332 in the X-direction. The protrusions 332 overlap the source drivers 11. The strips 334 do not overlap the source drivers 11.

In such a liquid-crystal display, the liquid-crystal panel (i.e., display panel) can have enhanced adhesion in a portion where the liquid-crystal panel is joined to the body 331, protrusions 332, and strips 334. Further, the protrusions 332 and strips 334 are only in the adhesive tape 330D, which is adjacent to the source drivers 11. This can suitably avoid deformation in the liquid-crystal panel near the source drivers 11 that tends to have relatively high temperature. Such a liquid-crystal display 10 can also reduce the width of the adhesive tapes 330A, 330B, and 330C, disposed at the edge of the chassis 80 and 90 other than the edge adjacent to the drivers 11, and thus can achieve a narrow frame.

Other Embodiments

The present invention is not limited to the foregoing embodiments described with reference to the drawings. The following embodiments for instance are also included in the technical scope of the present invention, and can be modified in various ways without departing from the technical scope.

(1) The direction where the protrusions extend can be modified, as appropriate, other than that described in the foregoing embodiments. The protrusions, although extending from the body to the plane inside in the foregoing embodiments, may extend in any direction. For instance, the protrusions may extend from the body to the plane outside, or may extend from the body to both the plane inside and the plane outside.

(2) The adhesive tape having protrusions can be modified, as appropriate, other than those described in the foregoing embodiments. For instance, the protrusions may be disposed only in the source-driver adhesive tape and arranged in parallel across the body. Alternatively, the protrusions may be disposed only in the gate-driver adhesive tape.

(3) The adhesive tape, although consisting of four parts, may consist of any number of parts. For instance, the adhesive tape may be a single component continuously extending along the chassis edge to form a frame.

(4) The configuration of the drivers can be modified, as appropriate, other than that described in the foregoing embodiments. For instance, a single driver may be mounted in the middle of the non-overlap portion in the X-direction through COG. Moreover, the driver may not overlap the adhesive tape. Furthermore, the driver may be mounted on the flexible board through chip-on-film (COF).

(5) The shape of the display device can be modified, as appropriate, other than that described in the foregoing embodiments. The display device, although having a rectangular shape in the embodiments, may have any shape. For instance, the display device may be circular or semicircular. The adhesive tape in this case has a body that is bent along the chassis edge.

(6) The display device described in the embodiments is installed in, but not limited to, a TV set. For instance, the foregoing display device is usable for a vehicle inner panel, a mobile information terminal, and other things.

The present invention is not limited to the description of the embodiments above and may be altered within the scope of the claims. Embodiments based on a proper combination of technical means disclosed in different embodiments are encompassed in the technical scope of the present invention. Furthermore, a new technological feature can be created by combining different technological means disclosed in the embodiments.

What is claimed is:

1. A display device that includes an illumination device and a display panel, the display panel facing the illumination device and displaying an image using light supplied from the illumination device, the display device comprising:
   a chassis housing the illumination device; and
   an adhesive tape bonding the display panel and the chassis together,
   wherein the adhesive tape has a comb-shape including
      a body disposed along an edge of the chassis, and
      a plurality of protrusions extending from the body.

2. The display device according to claim 1, wherein the plurality of protrusions each have a shape extending from the body inwardly in a plane of the display panel.

3. The display device according to claim 2, wherein
   the adhesive tape includes proximal ends from which the plurality of protrusions extend, and
   the display panel includes an end disposed outside the proximal ends in the plane of the display panel, so that the display panel is bonded to the plurality of protrusions and the body.

4. The display device according to claim 1, further comprising a driver configured to drive the display panel,
   wherein the plurality of protrusions are disposed at least at an edge of the chassis adjacent to the driver.

5. The display device according to claim 4, wherein the adhesive tape includes a strip extending, in a form of a strip, from the body at the edge of the chassis adjacent to the driver.

6. The display device according to claim 1, wherein the adhesive tape has the comb-shape along the entire circumference of the chassis.

7. The display device according to claim 1, wherein the display panel includes a liquid-crystal panel.

\* \* \* \* \*